March 12, 1968 L. A. HORLANDER, JR 3,372,633
WHISKEY BARREL
Filed Aug. 19, 1966

INVENTOR
LEO A. HORLANDER, JR.
BY
Dayton R. Stemple, Jr.
ATTORNEY

United States Patent Office 3,372,633
Patented Mar. 12, 1968

3,372,633
WHISKEY BARREL
Leo A. Horlander, Jr., Louisville, Ky., assignor to Brown-Forman Distillers Corporation, Louisville, Ky., a corporation of Delaware
Filed Aug. 19, 1966, Ser. No. 573,613
14 Claims. (Cl. 99—277.1)

ABSTRACT OF THE DISCLOSURE

This invention is directed to improved whiskey barrels capable of naturally accelerating the aging of whiskey by providing at least a portion of the internal surfaces with contours defining a multiplicity of spaced mounds, ridges, corrugations, lands or grooves prior to being charred to create greatly increased areas of char and of the underlying layer of red caramel in order to enhance the breathing of whiskey through the walls of the barrels.

---

This invention relates to new and useful improvements in whiskey barrels generally, and particularly seeks to provide a novel barrel for the aging of whiskey that is so constructed that the full or complete aging of whiskey contained therein is naturally accelerated to a substantial degree.

For both regulatory and practical reasons, the current practice followed by domestic distillers in aging whiskey is to put the new or unaged whiskey in internally charred barrels made of new or virgin oak and warehouse them for a period of from two to eight years. During this time the stored whiskey is subjected to repeated cycles of heating and cooling over a relative narrow temperature range, say 15 to 20°, with the maximum temperature seldom permitted to exceed about 90° F. The total number of heating and cooling cycles may vary from warehouse to warehouse, depending on the physical conditions of storage and on whether the warehouse is operated under temperature-control conditions or under conditions of natural temperature changes brought on by seasonal or other weather variations.

Acceleration of the aging of whiskey by increasing the heating and cooling cycles or by increasing the upper temperature of the heating phase, or by increasing the temperature range between the heating and cooling phases can be accomplished only within very narrow limitations. Beyond these limitations, only quick-aged whiskeys, as distinguished from fully or truly-aged whiskeys, are produced.

In any event, the aging process is continued until the whiskey has become fully and properly aged, as determined by sampling.

Obviously these warehousing operations require the use of large numbers of barrels and since, domestically, they are permitted to be used only once, the replacement requirements for new inventory are equally large.

Thus the problem is to provide a way of using or a change in construction of new oak whiskey barrels in such a manner that new whiskey stored therein can be more quickly brought to a fully or truly aged condition, so that substantial savings can be effected through reduced warehousing costs by a reduction in aging (storage) time, reduced total requirements of the number of barrels needed for warehousing and a possible reduction in ullage.

Emphasis is placed on new oak whiskey barrels because it is only those barrels that can be legally used for the aging of many types of whiskeys, and then only on a one-time use basis, although the principles of this invention are equally applicable to re-used barrels where permissible.

Heretofore many efforts have been made to solve this problem as by increasing the area of charred wood exposed to contact by the whiskey through the use of internal tubular oaken sleeves having their inner and outer surfaces charred; or by introducing a quantity of charred oak chips or flakes into the barrels; or by using a grooved, charred aging stick axially oriented within a non-wood container. Such approaches, while per se increasing the area of char for exposure to contact, cannot serve to promote the full or true aging of whiskey because such added devices are incapable of the "breathing" function that is so essential and without which no aging can take place.

Outward breathing takes place during the heating phases of the aging cycles in which the whiskey soaks through the charred inner surface of a barrel, then permeates through the underlying red caramel layer, which aids in the reaction of the congeners, and into the uncharred body portions of the barrel. Congeners are chemical compounds, such as aldehydes, higher alcohols and esters, that are retained in the whiskey and have a significant effect on its ultimate characteristics. Some evaporation takes place during each such heating phase as evidenced by an ullage of 15–20% or more at the conclusion of aging. The ullage includes about 3 gal. per standard 50 gal. barrel that is absorbed by the wood of the barrel. There is also an increase in proof during aging, say from about 103 to 109 over a four year period, thus clearly indicating that more water is evaporated than is alcohol.

Inward breathing takes place during the cooling phases of the aging cycles in which the whiskey is drawn back from the uncharred body portions of the barrel through the red caramel layer to further aid in the reaction of the congeners and through the charred inner surface of the barrel into the main body of the whiskey.

Whiskey barrels constructed in accordance with this invention solve the above discussed problems and enable the accelerated production of fully aged or truly aged whiskeys.

Therefore, an object of this invention is to provide a whiskey barrel so constructed as to enhance the breathing of whiskey through the walls thereof during aging whereby to result in a substantial reduction in the time required to produce a fully aged or truly aged whiskey.

Another object of this invention is to provide a whiskey barrel of the character stated in which the inner surface thereof is provided with contours defining a multiplicity of spaced mounds, ridges, corrugations, lands or grooves prior to being charred whereby to provide greatly increased areas of char and, more importantly, of the underlying layer of red caramel after charring is effected.

Another object of this invention is to provide a whiskey barrel of the character stated in which the uncharred outer surface thereof may be provided with contours defining a multiplicity of spaced ridges, corrugations, lands or grooves to further enhance the breathing of whiskey through the walls thereof.

A further object of this invention is to provide a whiskey barrel of the character stated that is constructed from new or virgin oak.

With these and other objects, the nature of which will be apparent, the invention will be more fully understood by reference to the drawings, the accompanying detailed description and the appended claims.

Figure 1:
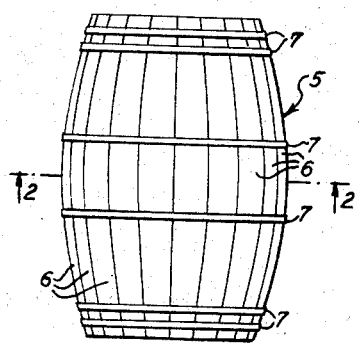
FIG. 1 is an elevation of a completely formed whiskey barrel constructed in accordance with this invention.

Referring to the drawings in detail, the invention as illustrated is embodied in a whiskey barrel 5 formed from a plurality of new oak staves 6 which are secured around end heads (not shown) by the usual hoops 7 fitting tightly therearound. The cooperage, naturally, is of the highest quality in order to avoid "leakers" since the whiskey will be stored therein for from 2–8 years or more.

Figure 2:
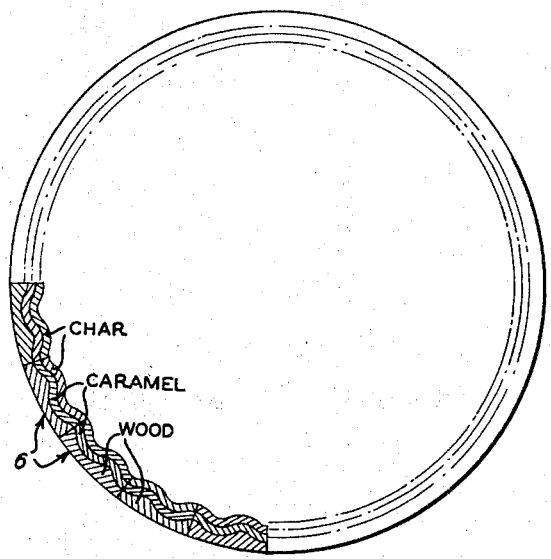
FIG. 2 is a horizontal section taken along line 2—2 of FIG. 1.
Figure 3:
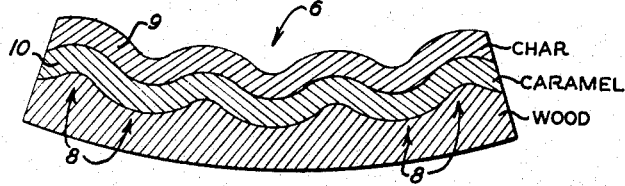
FIG. 3 is an enlarged horizontal section of one of the staves of FIG. 2.

In one form of this invention (see FIGS. 2 and 3) the inner surfaces of the staves 6 are contoured to define a series of spaced longitudinal corrugations 8 which may be of any suitable height and width, although they should not extend so deeply into the body of the stave that its strength is materially decreased. The proportions and dimensions of the corrugations 8 should be so selected as to define an exposed surface having an area from about 25% to about 200%, but preferably from about 50% to about 200%, greater than the uncontoured inner surface of the stave would have.

A group of contoured staves is assembled and coopered to form an open-ended barrel body which is then internally charred as by short exposure (10–20 seconds) to a high temperature gas flame. This effects the formation of an exposed layer 9 of charred wood, beneath which is a layer 10 of the red caramel, which in turn extends into the uncharred remainder of the stave. Then the heads are inserted into the ends and the final clamping hoops are applied to complete the barrel.

Alternatively, the barrel body may be first formed from a group of uncontoured staves, and its inner surface may then be suitably contoured by appropriate woodworking machinery prior to the gas flame charring.

In either case, the end result is to produce an inner charred layer and a complementary underlying layer of red caramel having areas substantially greater than the corresponding layers in charred uncontoured inner surfaces.

Of course, if the inner faces of the heads are also to be charred, suitable contours may first be formed thereon to cause an increase in the areas of the red caramel layers of the heads and thus further enhance the breathing capability of the barrel.

Figure 4:
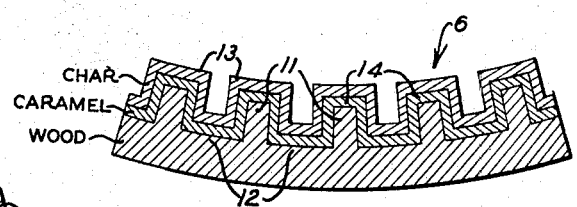
FIG. 4 is a view similar to FIG. 3 but showing a modification of the internal surface contouring.

FIG. 4 of the drawings shows a modified form of contouring for the inner surface of a stave or barrel which consists of a series of square or rectangularly cross-sectioned lands 11 separated by similarly cross-sectioned grooves 12. When subjected to gas flame charring as described above, a charred wood layer 13 and a red caramel layer 14 will be formed in which the areas thereof will be substantially greater than the corresponding layers in charred uncontoured inner surfaces.

Figure 5:
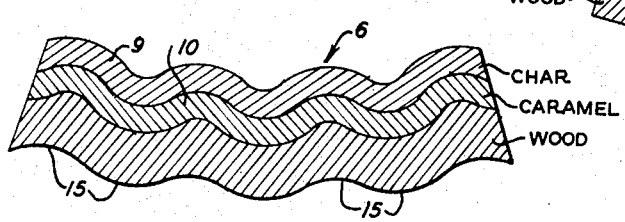
FIG. 5 is a view similar to FIG. 3 but showing both internal and external surface contouring.

Even though the breathing effect of whiskey barrels can be greatly enhanced by the above described types of construction, it is possible to further increase such effect, if desired, by additionally contouring the outer surface of the staves 6 as indicated at 15 in FIG. 5 of the drawings, thus increasing the size of the external barrel area exposed to the warehouse atmosphere.

Although for the purposes of illustrating this invention, only three types of surface contouring in a single direction have been shown, it will be appreciated that the principles of this invention can be employed in connection with many other contour shapes which may also be applied horizontally, diagonally or multi-directionally.

It will also be appreciated that barrels constructed in accordance with this invention may be used in connection with other types of alcoholic liquors in which aging thereof requires prolonged storage under "breathing" conditions.

It is, of course, to be understood that variations of arrangements and proportions of parts may be made within the scope of the appended claims.

I claim:
1. In an internally charred wooden barrel including a plurality of staves and heads combined to form a substantially leakproof container for containing new alcoholic liquor and aging same to a fully aged or truly aged condition through prolonged exposure to repeated heating and cooling cycles, a series of spaced contours formed over at least a portion of the inner surface of said barrel and containing alternating raised and depressed areas whereby to increase the area of the red caramel layer beneath said char and to increase the breathing effectiveness of said barrel for liquor aging purposes.

2. The barrel of claim 1 in which said contours are spaced parallel corrugations.

3. The barrel of claim 1 in which said contours are alternate lands and grooves.

4. The barrel of claim 1 in which said staves are formed from new or virgin oak.

5. The barrel of claim 4 in which said contours are spaced parallel corrugations.

6. The barrel of claim 4 in which said contours are alternate lands and grooves.

7. The barrel of claim 1 in which said contours are proportioned and dimensioned to effect an increase of the surface area of the red caramel layer of between about 50% and 200% compared to the same area when uncontoured.

8. The barrel of claim 7 in which at least a portion of the outer surface of the stave-formed body is provided with a series of contours containing alternating raised and depressed areas.

9. The barrel of claim 7 in which said contours are spaced parallel corrugations.

10. The barrel of claim 7 in which said contours are alternate lands and grooves.

11. The barrel of claim 7 in which said staves are formed from new or virgin oak.

12. The barrel of claim 8 in which said contours are spaced parallel corrugations.

13. The barrel of claim 8 in which said contours are alternate lands and grooves.

14. The barrel of claim 8 in which said staves are formed from new or virgin oak.

References Cited

UNITED STATES PATENTS

| | | | |
|---|---|---|---|
| 257,977 | 5/1882 | Rice | 99—277.1 |
| 279,019 | 6/1883 | Rice | 99—277.1 |
| 1,014,883 | 1/1912 | Klein | 99—277.1 X |
| 2,135,622 | 11/1938 | Nagle | 99—277.1 |
| 2,289,245 | 7/1942 | Dant | 99—277.1 |

WILLIAM I. PRICE, *Primary Examiner.*